US009154613B2

(12) United States Patent
Deluca et al.

(10) Patent No.: US 9,154,613 B2
(45) Date of Patent: *Oct. 6, 2015

(54) VOICE INPUT STATE IDENTIFICATION

(71) Applicant: International Business Machines Corporation, Armonk, NY (US)

(72) Inventors: Lisa Seacat Deluca, Baltimore, MD (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,579

(22) Filed: Oct. 22, 2014

(65) Prior Publication Data

US 2015/0036811 A1    Feb. 5, 2015

Related U.S. Application Data

(63) Continuation of application No. 13/444,632, filed on Apr. 11, 2012, now Pat. No. 8,891,740.

(51) Int. Cl.
*H04M 1/64* (2006.01)
*H04M 3/42* (2006.01)
*H04M 1/725* (2006.01)

(52) U.S. Cl.
CPC ............ *H04M 3/42* (2013.01); *H04M 1/72519* (2013.01); *H04M 1/72577* (2013.01)

(58) Field of Classification Search
CPC .............. H04M 3/42; H04M 1/72519; H04M 1/72577
USPC ................. 379/88.01–88.04, 202.01, 207.02, 379/388.03, 421; 455/563, 565, 412.1; 348/14.08, 14.12
See application file for complete search history.

(56) References Cited

U.S. PATENT DOCUMENTS

| | | | |
|---|---|---|---|
| 4,731,822 A | 3/1988 | Berry, III et al. | |
| 6,870,919 B2 | 3/2005 | Dobler | |
| 7,378,904 B2 | 5/2008 | Risbo | |
| 7,881,450 B1 | 2/2011 | Gentle et al. | |
| 8,019,078 B2 | 9/2011 | Chavez et al. | |
| 8,749,610 B1 * | 6/2014 | Gossweiler et al. | 348/14.08 |
| 2003/0185371 A1 | 10/2003 | Dobler | |
| 2006/0221177 A1 | 10/2006 | Chu et al. | |
| 2006/0280295 A1 | 12/2006 | Runcie | |
| 2007/0161366 A1 * | 7/2007 | Kraft et al. | 455/412.1 |

(Continued)

OTHER PUBLICATIONS

Non-final office action dated Mar. 13, 2014 for U.S. Appl. No. 13/444,632.

(Continued)

*Primary Examiner* — Md S Elahee
(74) *Attorney, Agent, or Firm* — Schmeiser, Olsen & Watts, LLP; Matthew Chung

(57) ABSTRACT

A method for indicating voice input state for a call on a communications device. A processor unit identifies the state of voice input for the call. In response to the state of the voice input being a mute state, the processor unit identifies a mute setting for the mute state based on a user profile. Thereafter, first audio data specified by the mute setting is played with audio data from the call on the communications device. In response to the state of the voice input being an unmute state, the processor unit identifies an unmute setting for the unmute state based on the user profile. Thereafter, second audio data specified by the unmute setting is played with the audio data from the call on the communications device.

20 Claims, 5 Drawing Sheets

(56) References Cited

U.S. PATENT DOCUMENTS

| | | |
|---|---|---|
| 2009/0028316 A1 | 1/2009 | Jaiswal et al. |
| 2010/0004024 A1* | 1/2010 | Wu .............................. 455/565 |
| 2010/0324891 A1 | 12/2010 | Cutler |
| 2013/0272508 A1 | 10/2013 | Deluca et al. |

OTHER PUBLICATIONS

Notice of Allowance dated Jul. 15, 2014 for U.S. Appl. No. 13/444,632.

* cited by examiner

VOICE INPUT STATE IDENTIFICATION

CROSS REFERENCE TO RELATED APPLICATION

This application is also a continuation of application Ser. No. 13/444,632, filed Apr. 11, 2012, now U.S. Pat. No. 8,891,740 issued Nov. 18, 2014.

BACKGROUND

1. Field

The disclosure relates generally to a communications system and more specifically to indicating voice input state during a conversation using devices in a communications system.

2. Description of the Related Art

During a telephone conversation, a user may wish to change the voice input state for the conversation. For example, during the conversation, a user may wish to change voice input state for the user to mute. When a voice input state for the user is mute the other parties to the conversation will not hear the audio occurring on their end of the conversation.

Often, after a user changes a voice input state on a conversation, the user forgets the current voice input state. Consequently, the user may try to add input to the conversation while voice input state is mute. Alternatively, a user may incorrectly believe voice input state is mute and may generate excessive noise unrelated to the conversation. This noise may be a source of embarrassment for the user or frustration to the other parties to the conversation.

Currently used solutions to this problem include initiation notifications and light indicators. Although these notifications are useful, these solutions do not always work. For example, an initiation notification only notifies the user of the current voice input state responsive to a change in the voice input state. As a result, a user must change the voice input state to receive an initiation notification. The use of light indicators requires a user to look at the communications device. Additionally, both of these solutions may be distracting during the conversation.

Accordingly, it would be advantageous to have a method, a computer program product, and an apparatus which takes into account one or more of the issues discussed above as well as possibly other issues.

SUMMARY

According to one illustrative embodiment, a method, apparatus, and computer program product for indicating voice input state for a call on a communications device is presented. A processor unit identifies the voice input state for the call. In response to the state of the voice input being a mute state, the processor unit identifies a mute setting for the mute state based on a user profile. First audio data specified by the mute setting is played with audio data from the call on the communications device. In response to the state of the voice input being an unmute state, the processor unit identifies an unmute setting for the unmute state based on the user profile. Second audio data specified by the unmute setting is played with the audio data from the call on the communications device.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
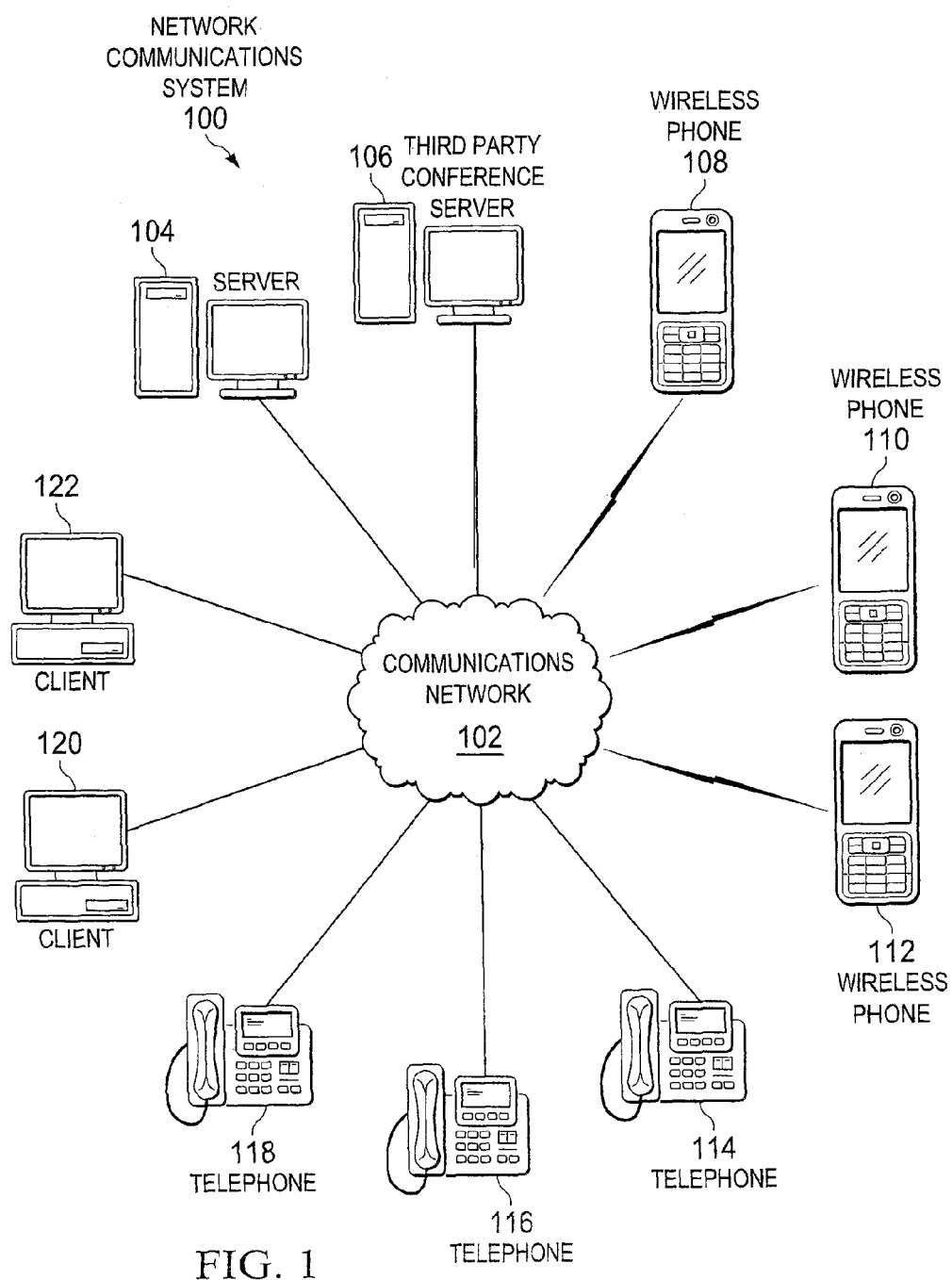
FIG. 1 is a network communications system in which illustrative embodiments may be implemented.

FIG. 1 is a network communications system in which illustrative embodiments may be implemented. Network communications system 100 is a network of devices in which the illustrative embodiments may be implemented. Network communications system 100 contains communications network 102, which is the medium used to provide communications links between various devices and computers connected together within network communications system 100. Communications network 102 may include connections such as wire, wireless communication links, or fiber optic cables.

In the depicted example, server 104 and third party conference server 106 connect to communications network 102. In addition, wireless phones 108, 110, and 112, telephones 114, 116, and 118, and clients 120 and 122 connect to communications network 102. Clients 120 and 122 may be, for example, a personal computer or a network computer. In the depicted example, server 104 provides information, such as boot files, operating system images, and applications to client 120. Clients 120 and 122 are clients to server 104 in this example. Network communications system 100 may include additional servers, clients, and other devices not shown. FIG. 1 is intended as an example, and not as an architectural limitation for the different illustrative embodiments.

Using the depicted devices, users of these devices may carry on conversations within network communications system 100. For example, a user may use wireless phone 108 to place a call to telephone 114. A user of client 120 may place a voice over internet protocol (IP) call to client 122. Users may also participate in a conference call through third party services, such as those provided by third party conference server 106.

During these communications, users may wish to change their voice input state. For instance, in the above example, the user of wireless phone 108 may wish to prevent the party using telephone 114 from hearing the audio on the user's end of the conversation. Accordingly, the user of wireless phone 108 may set the voice input state on the call as mute. If the user of wireless phone 108 wishes for the other party to hear audio on the user's end, the user will have the voice input state as unmute.

Further, illustrative embodiments may be implemented in one or more of the devices of FIG. 1 for indicating the voice input state for a call. For instance, in the above example, the user of wireless phone 108 may wish to receive an indication of the voice input state as mute. Accordingly, an illustrative embodiment may be implemented in wireless phone 108 of FIG. 1. The illustrative embodiments are not limited to a specific device. Accordingly, illustrative embodiments may be implemented in one or more of the devices of FIG. 1, such as telephones 114 and 116 and client 120.

Figure 2:
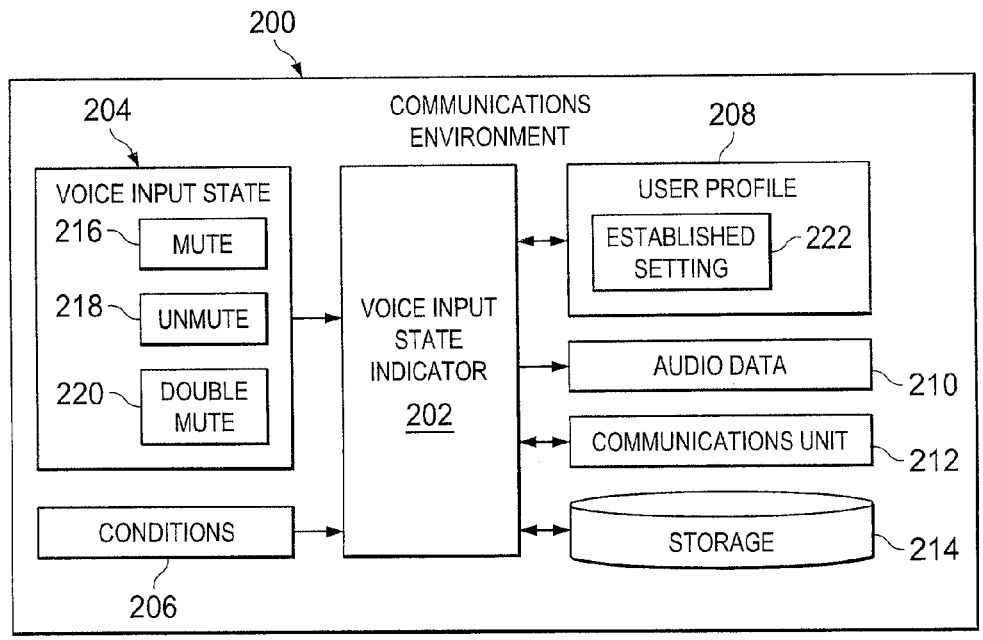
FIG. 2 is a block diagram of a communications environment in which illustrative embodiments may be implemented.

FIG. 2 is a block diagram of a communications environment in which illustrative embodiments may be implemented. Communications environment 200 may be implemented in a communications device of FIG. 1, for instance, telephone 114. Communications environment 200 includes voice input state indicator 202.

In the illustrative examples, voice input state indicator 202 is comprised of hardware, software, or some combination thereof. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

Voice input state indicator 202 is connected to communications unit 212 and storage 214. Voice input state indicator 202 may be configured to receive voice input state 204. As depicted, voice input state indicator 202 is configured to use voice input state 204 and user profile 208. In some illustrative examples, voice input state indicator 202 is configured to use voice input state 204, user profile 208, and conditions 206 to provide an indication of the current voice input state.

As depicted, voice input state 204 comprises at least one of mute 216, unmute 218, or double mute 220, and other suitable states. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

If voice input state 204 for the call is mute 216, parties to the conversation do not hear audio occurring on the mute end of the conversation. Voice input state 204 for the call is mute 216 if the voice input status of the communications device is mute. If the call is a conference call, voice input state 204 for the call is mute 216 if the voice input status of either the communications device or the third party conference server is mute. On a conference call, if the voice input status of both the communications device and the third party conference server is mute, voice input state 204 for the call is double mute 220. In the illustrative examples, voice input state 204 for the call is unmute 218 when mute 216 and double mute 220 are not present.

As depicted, voice input state 204 may be identified at a communications device. At the communications device, voice input state 204 may be identified from an input of keystrokes. For example, voice input state 204 may be identified at a communications device, such as wireless phone 108, by determining whether the mute button has been activated. Alternatively, in a communications device without a mute button, voice input state 204 may be identified from whether a mute code has been entered through a user input.

Yet further, in a conference call, voice input state 204 may be identified at the communications device by receipt of a transmission from a third party, such as third party conference server 106. Such transmission may be a signal indicating voice input state 204. Alternatively, such transmission may be an indication of the voice input status of third party conference server 106. Alternatively, when using a third party calling service, voice input state 204 may be identified at the communications device by recognition of voice commands from an operator.

In the case of a conference call, voice input state 204 may be identified at a third party conference server, such as third party conference server 106. Voice input state 204 may be identified at third party conference server 106 by determining whether a mute code has been entered. Further, voice input state 204 may be identified at third party conference 106 server by receipt of a transmission from a communications device. Such transmission may identify the voice input status of the communications device. Further, voice input state 204 may be identified at third party conference server 106 by recognition of voice commands from an operator.

As depicted, user profile 208 comprises established setting 222. User profile 208 may be saved on a communications device, such as wireless telephone 108 in FIG. 1. Alternatively, user profile 208 may be saved on a server, such as third party conference server 106 in FIG. 1.

Established setting 222 of user profile 208 may specify audio data 210 based on voice input state 204. Further, established setting 222 may specify audio data 210 based on conditions 206.

In one illustrative example, voice input state indicator 202 may receive voice input state 204 and conditions 206. Voice input state indicator 202 may identify a setting in user profile 208 which corresponds to voice input state 204 and conditions 206. This setting may be established setting 222. Voice input state indicator 202 may then play audio data 210. Audio data 210 may be stored in storage 214, obtained through communications unit 212, or some combination of the two. Audio data 210 may be a file in storage 214, such as an MP3 file stored on a wireless phone. Audio data 210 may also be obtained through communications unit 212, such as radio waves transmitted by a radio station. Audio data 210 may also be a combination of stored and received data. For example, audio data 210 may be the sound track of a game currently running on the communications device and in communication with the internet.

Playing of audio data 210 may be stopped at any time by a user input. The user input may only disable voice input state indicator 202 from playing audio data 210. Alternatively, the user input may disable all functions of voice input state indicator 202. The user input may disable audio data 210 for only the current call, or the user input may disable audio data 210 until a subsequent user input enabling audio data is received.

With one or more of the illustrative embodiments, passive unobtrusive voice input state indication is provided to users. In the illustrative embodiments, the user need not look at the communications device to determine the current voice input state 204. Further, in the illustrative embodiments, users need not remember voice input state 204. Instead, audio data 210 played with the audio data of the call indicates voice input state 204. Additionally, audio data 210 played with the audio data of the call indicates voice input state 204 without obscuring the audio data from the call. Further, the illustrative embodiments may indicate any voice input state 204, including double mute 220.

The illustrative embodiments are also customizable to indicate voice input state 204 based on user selections. Accordingly, audio data 210 may be selected by the user to be non-distracting and informative to the user. Audio data 210 may also be specified for selected conditions 206 to additionally indicate the circumstances of the call.

The illustration of communications environment 200 and components in the environment in FIGS. 1 and 2 are not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, established setting 222 may not be present within user profile 208. Further, more than one setting may be present within user profile 208. For instance, each setting present within user profile 208 may be established for a single condition. In another example, each setting present within user profile 208 may be directed to a single voice input state 204. Further, conditions 206 may not be supplied to voice input state indicator 202. Also, voice input state indicator 202 and user profile 208 may both be present within a single device, such as wireless phone 108 of FIG. 1. However, voice input state indicator 202 and user profile 208 of FIG. 2 may instead be present within separate devices, such as telephone 114 and server 104 of FIG. 1.

Figure 3:
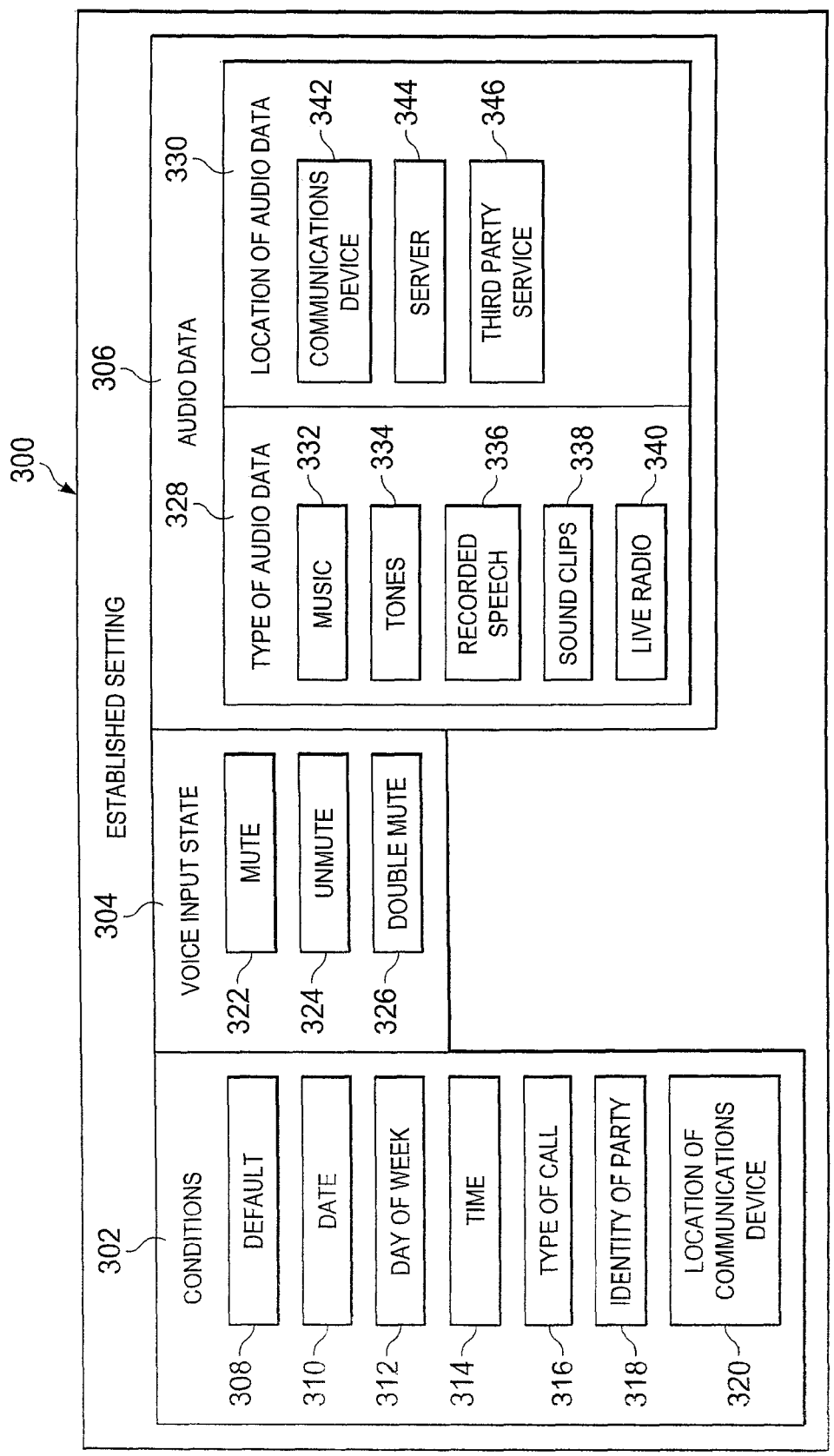
FIG. 3 is a block diagram of an established setting in accordance with the illustrative embodiments.

Referring now to FIG. 3, a block diagram of an established setting is disclosed. The established setting may be established setting 222 in FIG. 2. Established setting 300 is an illustrative example of settings which may be present in illustrative embodiments. Accordingly, established setting 300 may be one of a plurality of settings within user profile 208 of FIG. 2. Established setting 300 includes conditions 302, voice input state 304, and audio data 306.

Established setting 300 may be created from user input or may be a default setting. Established setting 300 may be created on a communications device, such as wireless phone 108 in FIG. 1. Alternatively, established setting 300 may be created through a server, such as third party conference server 106 in FIG. 1. By creating established setting 300 through a server, established setting 300 may be available to a plurality of communications devices.

In established setting 300, conditions 302 may comprise default 308, date 310, day of week 312, time 314, type of call 316, identity of party 318, and location of communications device 320. Conditions 302 are circumstances of a call. For example, type of call 316 may be a call with one party or type of call 316 may be a conference call. If type of call 316 is a conference call, the conference call may be established through the communications device itself or through a third party conference server, such as third party conference server 106 in FIG. 1.

Conditions 302 may include location of communications device 320. Location of communications device 320 may comprise a geographic location of the communications device or a relative location of the communications device. For example, location of communications device 320 may be in the user's office. Another location of communications device 320 may be within a relative distance of other active communications devices.

Using selected conditions, established setting 300 addresses a specific condition or a default condition. For example, established setting 300 may be customized to play audio data 306 for default 308. Established setting 300 may also be customized to play a different audio data on Mondays. Further, established setting 300 may be customized to address a plurality of conditions. For example, established setting may be customized to play a specified audio data on Mondays in the morning hours.

In this illustrative embodiment, established setting 300 further comprises voice input state 304. Voice input state 304 may comprise mute 322, unmute 324, or double mute 326. Established setting 300 may be used to indicate a voice input state on a call when conditions 302 and voice input state 304 of established setting 300 are the same as the current voice input state and the current conditions of a call.

In some illustrative examples, established setting 300 may include selections for only one voice input state. For example, established setting 300 may be customized to play specific audio data on Mondays when voice input state 304 is unmute 324. However, established setting 300 may alternatively be customized to specify corresponding audio data for multiple voice input states. For example, established setting 300 may be customized to specify a different corresponding audio data on Mondays for each voice input state 304 of mute 322, unmute 324, and double mute 326.

Established setting 300 further comprises audio data 306. Audio data 306 may comprise type of audio data 328 and location of audio data 330. Type of audio data 328 may be any type of audible media. For example, type of audio data 328 may comprise music 332, tones 334, recorded speech 336, sound clips 338, and live radio 340.

Type of audio data 328 allows customization of established setting 300 for different scenarios. For example, in established setting 300, type of audio data 328 may be music 332. Music 332 may comprise a single song, a soundtrack, a mix of selected songs, or any other type of musical composition.

By selecting different audio data 306 for different voice input states, audio data 306 played during a call may quickly indicate voice input state 304 to a user. In fact, established setting 300 may comprise different corresponding types of audio data for each voice input state 304 of mute 322, unmute 324, and double mute 326. For example, established setting 300 may designate that music 332 be played while voice input state 304 is mute 322, tones 334 be played while voice input state 304 is unmute 324, and live radio 340 be played while voice input state 304 is double mute 326.

Additionally, type of audio data 328 may be the same for each voice input state 304. For instance, music 332 may be played for each voice input state 304. Accordingly, a different selection of music may be played for each voice input state 304. In this case, established setting 300 may be customized to play music 332 with a frenzied pace while voice input state 304 is mute 322. Established setting may also be customized to play music 332 with a slower pace while voice input state 304 is unmute 324. Although both customizations comprise the same type of audio data 328, music 332, the specific music selection quickly identifies voice input state 304 to a user.

Additionally, specific musical compositions may also be chosen. For instance, the Phantom of the Opera soundtrack may play while voice input state 304 is mute 322. In this way, a user may quickly recognize that voice input state 304 is mute 322 by the specific song which is playing.

Alternatively, a setting may comprise a specific style of music. In this case, type of audio data 328 may be live radio 340. A user may quickly recognize voice input state 304 by the style of music, such as country music.

Voice input state 304 of double mute 326 may be indicated by different audio data than other voice input states. For instance, audio data 306 for mute 322 and unmute 324 may be tones 334, while audio data 306 for double mute 326 may be live radio 340. As another example, a different selection of music may be played for each voice input state 304 of mute 322, unmute 324, and double mute 326.

Alternatively, voice input state 304 of double mute 326 may be indicated by the same audio data 306 as the setting for mute 322. Accordingly, when a user removes only one mute in voice input state 304 of double mute 326, audio data 306 which indicates mute 322 continues to be played.

Audio data 306 further comprises location of audio data 330. Location of audio data 330 may comprise communications device 342, server 344, and third party service 346. Server 344 may be a server providing data to a client, such as server 104 in FIG. 1. Server 344 may alternatively be a conference server such as third party conference server 106 in FIG. 1. Third party service 346 may be a service utilized by the communications device, such as communications device 342. For example, audio data 306 may be live radio 340 streaming from a radio station. Alternatively, audio data 306 may be from a third party application active on the communications device.

Figure 4:
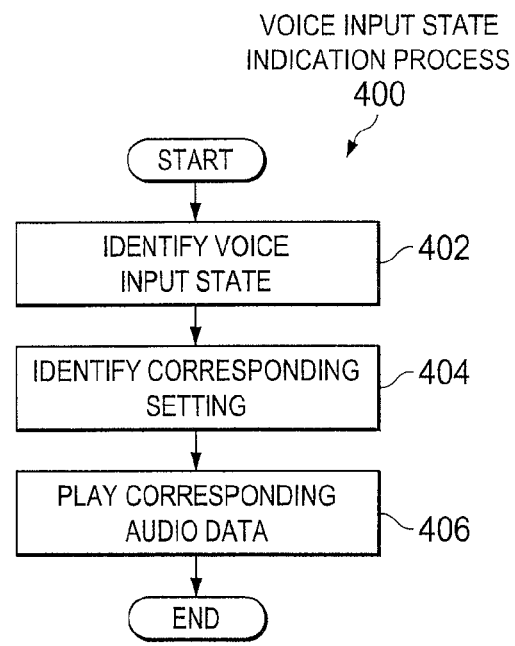
FIG. 4 is a flowchart of a voice input state indication process in accordance with the illustrative embodiments.

With reference now to FIG. 4, a flowchart of a voice input state indication process is disclosed in accordance with the illustrative embodiments. Voice input state indication process 400 may be implemented in communications environment 200 of FIG. 2, for instance, by voice input state indicator 202.

Voice input state indication process 400 begins by identifying voice input state (step 402). The process then identifies corresponding setting (step 404). Corresponding setting may be established setting 300 of FIG. 3. Corresponding setting may also be a setting in a plurality of settings. For example, if voice input state is mute, corresponding setting may be a setting which corresponds to the mute state. Further, corresponding setting may be for voice input state of mute and condition, such as a specific day of the week.

Using the corresponding setting, corresponding audio data is played (step 406). Corresponding data may be audio data 210 in FIG. 2. Corresponding audio data may be stored in storage on the communications device, obtained through a communications unit, or by some combination. For example, corresponding audio data may be obtained by streaming a radio station. Corresponding audio data might also be a song stored as an MP3 or other file on the communications device. Corresponding audio data is played with audio data from the call. However, corresponding audio data does not interfere with or detract from the audio data from the call.

In an illustrative example, a user works remotely but wishes to listen to a weekly meeting. Accordingly, the user places a call to the conference room. As the user does not contribute to the meeting and wishes to avoid distracting the meeting participants, the user sets the voice input state for the call to mute. Voice input state indication process 400 identifies the voice input state as mute. Voice input state indication process 400 next identifies a mute setting. The user has selected the series of tones from "Close Encounters of the Third Kind" as the audio data for the mute setting. Accordingly, this series of tones is played with the audio data from the call. Hearing the series of tones played with the audio data of the call, the user recognizes the voice input state for the call is mute.

Figure 5:
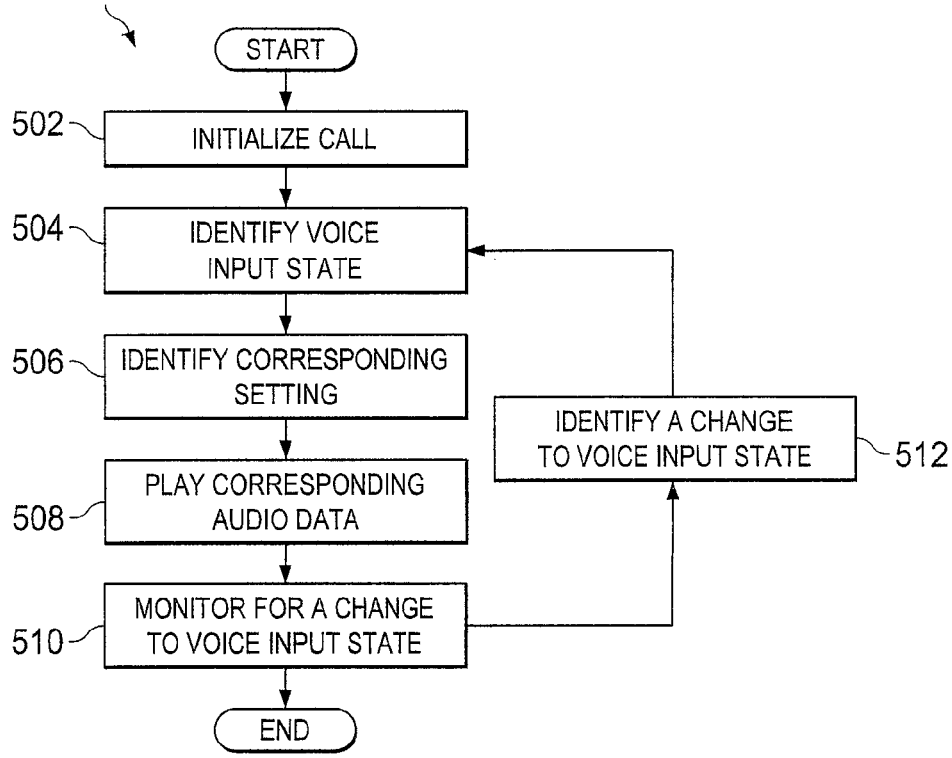
FIG. 5 is a flowchart of a voice input state indication process in accordance with the illustrative embodiments.

With reference now to FIG. 5, a flowchart of a voice input state indication process is disclosed in accordance with the illustrative embodiments. Voice input state indication process 500 may be implemented in communications environment 200 of FIG. 2, for instance, by voice input state indicator 202. Voice input state indication process 500 begins by initializing a call (step 502). The process then identifies the voice input state (step 504), identifies corresponding setting (step 506), plays corresponding audio data (step 508), and monitors for a change to voice input state (step 510). If the process identifies a change to voice input state (step 512), the process returns to step 504, and if not, stops.

Voice input state indication process 500 may be implemented when a user enters an environment which may be disruptive to a conversation. For example, a user may call the user's mother during the user's walk to work. After initializing the call in step 502, voice input state indication process 500 identifies the voice input state as unmute in step 504. Voice input state indication process 500 then identifies an unmute setting in step 506, and plays corresponding audio data from unmute setting in step 508. In this case, the Jurassic Park theme is the corresponding audio data from the unmute setting.

While conversing with the user's mother, the user may enter a local café to purchase a cup of coffee. The user recognizes the background noise in the café is loud, and chooses to change the voice input state on the user's wireless phone to mute when entering the cafe. Accordingly, voice input state indication process 500 identifies the change of voice input state to mute in steps 512 and 504. Voice input state indication process 500 then identifies a mute setting in step 506, and plays corresponding audio data from mute setting in step 508. In this case, "the Phantom of the Opera" soundtrack is the corresponding audio data from the mute setting. Accordingly, the user recognizes the voice input state is mute when the user hears "the Phantom of the Opera" soundtrack played along with the audio data of the call. Voice input state indication process 500 continues to monitor for a change to the voice input state during the call in step 510.

When the user receives a cup of coffee and exits the cafe, the background noise is lower, and the user changes the voice input state on the wireless phone to unmute. Voice input state indication process 500 identifies the change of voice input state to unmute in steps 512 and 504, identifies an unmute setting in step 506, and plays the corresponding audio data from the unmute setting in step 508. The user recognizes the voice input state is unmute when the user hears the corresponding audio data, the Jurassic Park theme.

A change to voice input state as in the previous example may be accomplished in a variety of ways. A change to voice input state may be the result of an individual keystroke or a series of inputs. To change voice input state on wireless phone 108 in FIG. 1, a user may press a mute button on the wireless phone. However, if a communications device does not comprise a mute button, a series of keystrokes or other forms of input may be required to change the voice input state. If the call is a conference call, the user may press a plurality of keys to enter a mute combination for the conference server, such as third party conference server 106 of FIG. 1.

In another example, a user changes the voice input state through two different methods. The user is on a conference call implemented through a third party conference server, such as third party conference server 106 in FIG. 1. The user uses a telephone, such as telephone 114 in FIG. 1. The user wishes to speak privately with a group member in the user's office while still hearing the meeting. Accordingly, the user first presses a mute button on the telephone. Voice input state indication process 500 identifies the change of voice input state to mute in step 504. Voice input state indication process 500 then identifies a mute setting in step 506, and plays corresponding audio data from mute setting in step 508. In this case, the audio data from the mute setting is the user's company jingle.

The user additionally chooses to press a plurality of keys to enter a mute combination for the conference server. As the voice input status at the telephone is mute, and the voice input status at the third party conference server is also mute, this is a voice input state for the call of double mute. Accordingly, voice input state indication process 500 identifies the change of voice input state to double mute in steps 512 and 504. Voice input state indication process 500 then identifies a double mute setting in step 506, and plays corresponding audio data from double mute setting in step 508. In this case, the audio data from the double mute setting is also the user's company jingle.

Once the user is finished speaking privately with the group member, the user enters a plurality of keys to enter an unmute combination for the conference server. Now the voice input status at the telephone remains mute, while the voice input status at the third party conference server is unmute. Thus the voice input state for the call is mute. Accordingly, voice input state indication process 500 identifies the change of voice input state to mute in steps 512 and 504. Voice input state indication process 500 then identifies a mute setting in step 506, and plays corresponding audio data from mute setting in step 508. As the audio data from both the mute and double mute settings is the user's company jingle, the user's company jingle continues to play.

The user recognizes, as the company jingle continues to play, that the voice input state is mute. Accordingly, the user may press the mute button on his phone. Thereafter, the voice input status at both the telephone and the third party conference server is unmute. Accordingly, the voice input state for the call is unmute. Voice input state indication process 500 identifies the change of voice input state to unmute in steps 512 and 504. Voice input state indication process 500 then identifies an unmute setting in step 506, and plays corresponding audio data from unmute setting in step 508.

Figure 6:
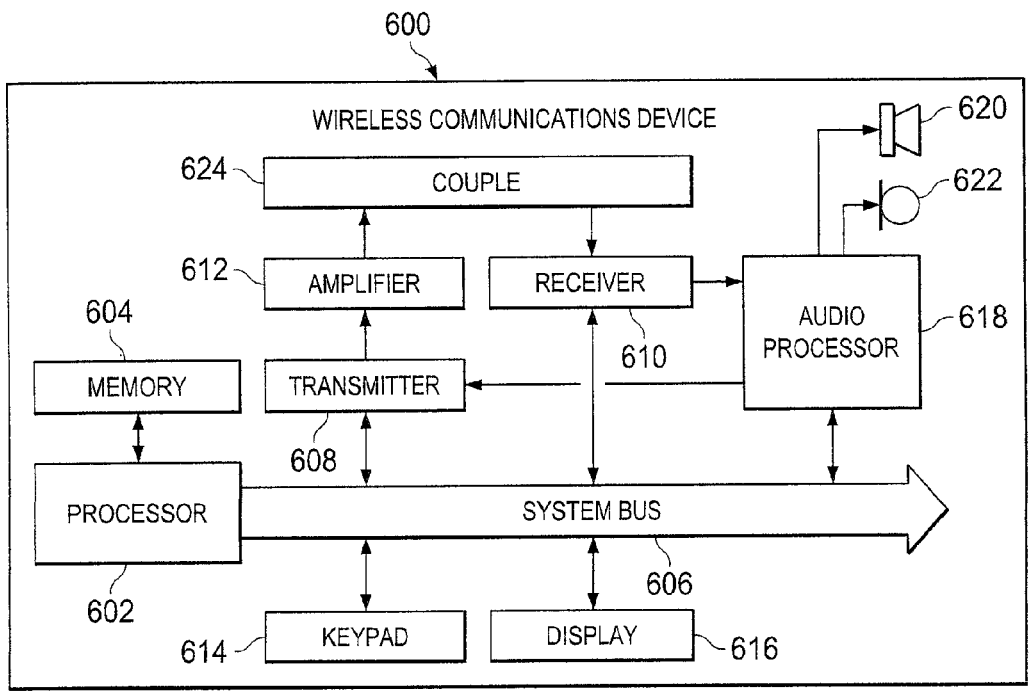
FIG. 6 is a block diagram of a wireless communication device in which illustrative embodiments may be implemented.

FIG. 6 is a block diagram of a wireless communication device in which an illustrative embodiment may be implemented. Wireless communication device 600 may be a wireless communication device in FIG. 1, for instance, wireless phone 108. Wireless communication device 600 includes processor 602 for controlling operation of the communication device and memory 604. Processor 602 may be a general-purpose microprocessor operating under the control of instructions stored a memory, such as memory 604, or device-specific circuitry for controlling the operation of the telephone device. Processor 602 is connected by system bus 606 to transmitter 608, receiver 610, keypad 614, display 616, and audio processor 618. Keypad 614 may be a keypad and/or buttons. Display 616 may be any type of display device including a liquid crystal display (LCD) or other known displays, such as a cathode ray tube or active matrix display.

Transmitter 608 and receiver 610 are coupled to a telephone signal by couple 624 to provide full duplex communication. The telephone signal may be provided by a telephone line (not shown) in a land-based telephone or an antenna, such as for a wireless telephone. Audio processor 618 provides basic analog audio outputs to speaker 620 and accepts analog audio inputs from microphone 622. Received signals are demodulated and decoded by receiver 610. Transmitter 608 encodes and modulates signals passed to it by processor 602 or audio processor 618. The output of transmitter 608 is amplified by power amplifier 612 to control the power level at which the signal is transmitted.

Processor 602 may identify a change to the voice input state from keypad 614 and display 616. Processor 602 or audio processor 618 may also identify conditions, such as conditions 206 in FIG. 2. Memory 604 may include a user profile, such as user profile 208 of FIG. 2, and audio data, such as audio data 210 of FIG. 2. Audio processor 618 may play audio data, such as audio data 210 of FIG. 2, through speaker 620. Those of ordinary skill in the art will appreciate that the hardware depicted in FIG. 6 may vary.

Figure 7:
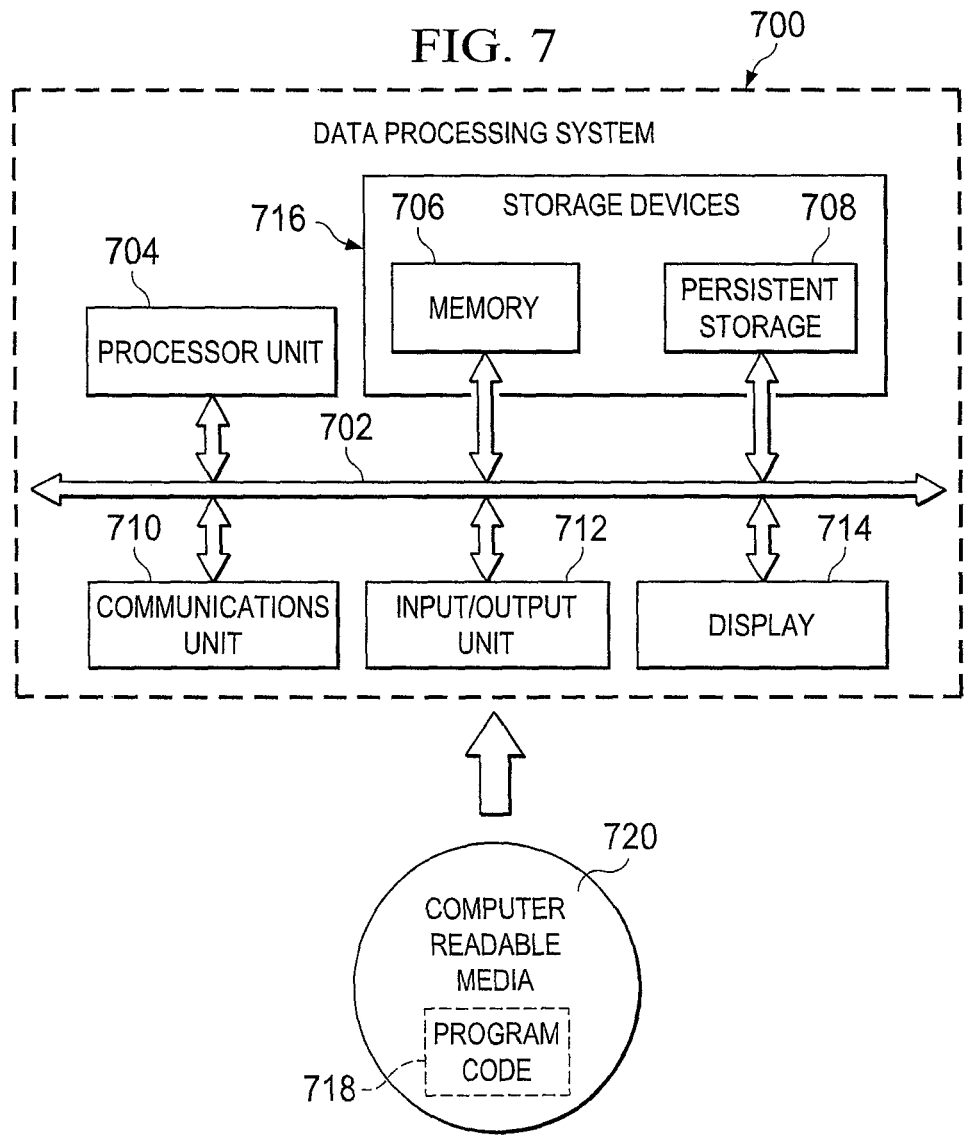
FIG. 7 is a diagram of a data processing system in which illustrative embodiments may be implemented.

With reference now to FIG. 7, a diagram of a data processing system is depicted in accordance with an illustrative embodiment. Data processing system 700 is an example of a computer, such as server 104 or client 120 in FIG. 1, in which computer usable program code or instructions implementing the processes may be located for the illustrative embodiments. In this illustrative example, data processing system 700 includes communications fabric 702, which provides communications between processor unit 704, memory 706, persistent storage 708, communications unit 710, input/output (I/O) unit 712, and display 714.

Processor unit 704 serves to run instructions for software that may be loaded into memory 706. Processor unit 704 may be a set of one or more processors or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Memory 706, in these examples, may be, for example, a random access memory, or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in these examples, provides for communication with other data processing systems or devices. In these examples, communications unit 210 is a network interface card. Communications unit 710 may provide communications through the use of either or both physical and wireless communications links.

Input/output unit 712 allows for the input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for running by processor unit 704. The processes of the different embodiments may be performed by processor unit 704 using computer implemented instructions, which may be located in a memory, such as memory 706.

These instructions are referred to as program code, computer usable program code, or computer readable program code that may be read and run by a processor in processor unit 704. The program code, in the different embodiments, may be embodied on different physical or computer readable storage media, such as memory 706 or persistent storage 708.

Program code 718 is located in a functional form on computer readable media 720 that is selectively removable and may be loaded onto or transferred to data processing system 700 for running by processor unit 704. The data processing system providing program code 718 may be a server computer, a client computer, or some other device capable of storing and transmitting program code 718.

The different components illustrated for data processing system 700 are not meant to provide physical or architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, communications unit 710 may include one or more devices used to transmit and receive data, such as a modem or a network adapter. Further, a memory may be, for example, memory 706 or a cache such as found in an interface and memory controller hub that may be present in communications fabric 702.

Thus, with the illustrative embodiments, a user need not look at the communications device to determine the current voice input state. Further, in the illustrative embodiments, the user may receive continuous indication of voice input state. Audio data may also be specified for selected conditions to additionally indicate the circumstances of the call. Audio data played with the audio data of the call indicates voice input state without obscuring the audio data from the call. Further, the illustrative embodiments may indicate any voice input state, including double mute.

The illustrative embodiments are also customizable to indicate voice input state based on user selections. Accordingly, audio data may be selected by the user to be non-distracting and informative to the user. Further, users may choose to stop indication of voice input state. A user may choose to stop indications for one voice input state, for one condition, or may stop voice input state indication entirely.

As will be appreciated by one skilled in the art, the illustrative embodiments may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, the illustrative embodiments may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction running system, apparatus, or device. The computer-usable medium may include a propagated data signal with the computer-usable program code embodied therewith, either in baseband or as part of a carrier wave. The computer usable program code may be transmitted using any appropriate medium, including but not limited to, wireless, line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to the illustrative embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The illustrative embodiments have been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of indicating voice input state for a call on a communications device, said method comprising:
    identifying, by a processor unit, the voice input state for the call, the communications device being used by a user to communicate with a party during the call;
    responsive to the voice input state being identified as a mute state, identifying, by the processor unit, a first setting for the mute state, wherein the first setting for the mute state specifies: (i) first conditions which must be satisfied during the call in order for the voice input state to be the mute state and (ii) a first type of audio to be played on the communications device during the call while the voice input state is the mute state, wherein the first conditions comprise a first type of the call and an identity of a first party to whom the user is communicating with during the call, and wherein the first type of audio is selected from the group consisting of music, tones, live radio, and combinations thereof; and
    during the call in the mute state characterized by the first setting, continuously playing on the communications device, by the processor unit, (i) the first type of audio and (ii) audio from the call as background audio.

2. The method of claim 1, wherein the processor unit is located in at least one of the communications device, a computer, or a server.

3. The method of claim 1, wherein the first type of audio comprises the music, the tones, or both the music and the tones.

4. The method of claim 1, wherein the first type of audio is stored in a location selected from at least one of the communications device, a server, or third party service.

5. The method of claim 1, wherein said identifying the voice input state for the call comprises:
    identifying the voice input state for the call in response to the call starting.

6. The method of claim 1, said method further comprising:
    responsive to the voice input state being identified as an unmute state, identifying, by the processor unit, a second setting for the unmute state, wherein the second setting for the unmute state specifies: (i) second conditions which must be satisfied during the call in order for the voice input state to be the unmute state and (ii) a second type of audio to be played on the communications device during the call while the voice input state is the unmute state, wherein the second conditions include a second type of the call and an identity of a second party to whom the user is communicating with during the call, wherein the second type of audio is selected from the group consisting of music, tones, live radio, and combinations thereof; and
    during the call in the unmute state characterized by the second setting, continuously playing on the communications device, by the processor unit, (i) the second type of audio and (ii) the audio from the call as background audio.

7. The method of claim 6, wherein the second type of call differs from the first type of call.

8. The method of claim 6, wherein the second type of audio differs from the first type of audio.

9. A computer program product, comprising one or more computer readable hardware storage devices and program code stored on the one or more storage devices, said program code containing instructions which, upon being executed by a processor unit, implement a method of indicating voice input state for a call on a communications device, said method comprising:

identifying, by the processor unit, the voice input state for the call, the communications device being used by a user to communicate with a party during the call;

responsive to the voice input state being identified as a mute state, identifying, by the processor unit, a first setting for the mute state, wherein the first setting for the mute state specifies: (i) first conditions which must be satisfied during the call in order for the voice input state to be the mute state and (ii) a first type of audio to be played on the communications device during the call while the voice input state is the mute state, wherein the first conditions comprise a first type of the call and an identity of a first party to whom the user is communicating with during the call, and wherein the first type of audio is selected from the group consisting of music, tones, live radio, and combinations thereof; and during the call in the mute state characterized by the first setting, continuously playing on the communications device, by the processor unit, (i) the first type of audio and (ii) audio from the call as background audio.

10. The computer program product of claim 9, wherein the processor unit is located in at least one of the communications device, a computer, or a server.

11. The computer program product of claim 9, wherein the first type of audio comprises the music, the tones, or both the music and the tones.

12. The computer program product of claim 9, wherein the first type of audio is stored in a location selected from at least one of the communications device, a server, or third party service.

13. The computer program product of claim 9, wherein said identifying the voice input state for the call comprises:
    identifying the voice input state for the call in response to the call starting.

14. The computer program product of claim 9, said method further comprising:
    responsive to the voice input state being identified as an unmute state, identifying, by the processor unit, a second setting for the unmute state, wherein the second setting for the unmute state specifies: (i) second conditions which must be satisfied during the call in order for the voice input state to be the unmute state and (ii) a second type of audio to be played on the communications device during the call while the voice input state is the unmute state, wherein the second conditions include a second type of the call and an identity of a second party to whom the user is communicating with during the call, wherein the second type of audio is selected from the group consisting of music, tones, live radio, and combinations thereof; and
    during the call in the unmute state characterized by the second setting, continuously playing on the communications device, by the processor unit, (i) the second type of audio and (ii) the audio from the call as background audio.

15. A system comprising: a processor unit, one or more computer readable hardware storage devices, one or more memories, said one or more storage devices containing program code which, upon being executed by the processor unit via the one or more memories, implements a method of indicating voice input state for a call on a communications device, said method comprising:
    identifying, by the processor unit, the voice input state for the call, the communications device being used by a user to communicate with a party during the call;
    responsive to the voice input state being identified as a mute state, identifying, by the processor unit, a first setting for the mute state, wherein the first setting for the mute state specifies: (i) first conditions which must be satisfied during the call in order for the voice input state to be the mute state and (ii) a first type of audio to be played on the communications device during the call while the voice input state is the mute state, wherein the first conditions comprise a first type of the call and an identity of a first party to whom the user is communicating with during the call, and wherein the first type of audio is selected from the group consisting of music, tones, live radio, and combinations thereof; and
    during the call in the mute state characterized by the first setting, continuously playing on the communications device, by the processor unit, (i) the first type of audio and (ii) audio from the call as background audio.

16. The system of claim 15, wherein the processor unit is located in at least one of the communications device, a computer, or a server.

17. The system of claim 15, wherein the first type of audio comprises the live radio.

18. The system of claim 15, wherein the first type of audio is stored in a location selected from at least one of the communications device, a server, or third party service.

19. The system of claim 15, wherein said identifying the voice input state for the call comprises:
    identifying the voice input state for the call in response to the call starting.

20. The system of claim 15, said method further comprising:
    responsive to the voice input state being identified as an unmute state, identifying, by the processor unit, a second setting for the unmute state, wherein the second setting for the unmute state specifies: (i) second conditions which must be satisfied during the call in order for the voice input state to be the unmute state and (ii) a second type of audio to be played on the communications device during the call while the voice input state is the unmute state, wherein the second conditions include a second type of the call and an identity of a second party to whom the user is communicating with during the call, wherein the second type of audio is selected from the group consisting of music, tones, live radio, and combinations thereof; and
    during the call in the unmute state characterized by the second setting, continuously playing on the communications device, by the processor unit, (i) the second type of audio and (ii) the audio from the call as background audio.

* * * * *